United States Patent
Yamauchi

(10) Patent No.: US 10,796,848 B2
(45) Date of Patent: Oct. 6, 2020

(54) WIRELESS POWER SUPPLY COIL UNIT

(71) Applicant: NISSAN MOTOR CO., LTD., Yokohama-shi, Kanagawa-ken (JP)

(72) Inventor: Yuuya Yamauchi, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 16/478,957

(22) PCT Filed: Jan. 30, 2017

(86) PCT No.: PCT/JP2017/003150
§ 371 (c)(1),
(2) Date: Jul. 18, 2019

(87) PCT Pub. No.: WO2018/138909
PCT Pub. Date: Aug. 2, 2018

(65) Prior Publication Data
US 2019/0348218 A1 Nov. 14, 2019

(51) Int. Cl.
*H01F 38/14* (2006.01)
*H02J 50/12* (2016.01)
*B60L 53/12* (2019.01)
*H01F 27/32* (2006.01)
*H02J 5/00* (2016.01)
*H02J 7/02* (2016.01)

(52) U.S. Cl.
CPC ............ *H01F 38/14* (2013.01); *B60L 53/12* (2019.02); *H01F 27/32* (2013.01); *H02J 5/005* (2013.01); *H02J 7/025* (2013.01); *H02J 50/12* (2016.02)

(58) Field of Classification Search
CPC .......... H01F 38/14; H01F 27/32; H02J 50/12; H02J 5/005; H02J 7/025; B60L 53/12
See application file for complete search history.

(56) References Cited

U.S. PATENT DOCUMENTS 7,492,247 B2 * 2/2009 Schmidt .............. H01F 17/0013
336/200
2008/0129246 A1 6/2008 Morita et al.
(Continued)

FOREIGN PATENT DOCUMENTS

| CN | 1161100 A | 10/1997 |
|---|---|---|
| EP | 2 535 906 A1 | 12/2012 |

(Continued)

OTHER PUBLICATIONS

Dielectric Strength—Wikipedia dated Oct. 29, 2019.

*Primary Examiner* — Jared Fureman
*Assistant Examiner* — Duc M Pham
(74) *Attorney, Agent, or Firm* — Foley & Lardner LLP

(57) ABSTRACT

A wireless power supply coil unit for transmitting or receiving power wirelessly includes a coil having a hollow portion and a coil axis in a vertical direction, a first magnetic body having an opening at a position corresponding to the hollow portion of the coil, a second magnetic body having a plate-like shape and arranged in the hollow portion of the coil on one side of the first magnetic body, and an insulating plate interposed between the first magnetic body and the second magnetic body. The coil unit has high surface stiffness of the magnetic bodies and prevents or reduces dielectric breakdown between contact surfaces of the magnetic bodies.

6 Claims, 4 Drawing Sheets

(56) References Cited

U.S. PATENT DOCUMENTS

| | | |
|---|---|---|
| 2010/0007215 A1 | 1/2010 | Sakuma |
| 2010/0156401 A1 | 6/2010 | Nishiguchi et al. |
| 2010/0181842 A1 | 7/2010 | Suzuki et al. |
| 2015/0145343 A1 | 5/2015 | Chiyo et al. |
| 2015/0279554 A1 | 10/2015 | Ryoson et al. |
| 2016/0093570 A1* | 3/2016 | Watanabe ......... H01L 23/49541 257/531 |
| 2016/0268847 A1 | 9/2016 | Yuasa |

FOREIGN PATENT DOCUMENTS

| | | | |
|---|---|---|---|
| JP | 63-113913 | A | 5/1988 |
| JP | 09-035965 | A | 2/1997 |
| JP | 2006-032560 | A | 2/2006 |
| JP | 2008-120239 | A | 5/2008 |
| JP | 2008-294385 | A | 12/2008 |
| JP | 2010-041906 | A | 2/2010 |
| JP | 2014-078847 | A | 5/2014 |
| JP | 2015-106939 | A | 6/2015 |
| JP | 2015-153863 | A | 8/2015 |
| JP | 2016-105435 | A | 6/2016 |
| JP | 2016-129164 | A | 7/2016 |
| JP | 2017-011079 | A | 1/2017 |
| JP | 2017-017874 | A | 1/2017 |

\* cited by examiner

WIRELESS POWER SUPPLY COIL UNIT

TECHNICAL FIELD

The present invention relates to a wireless power supply coil unit used for wirelessly charging a battery mounted on a vehicle.

BACKGROUND ART

A wireless power supply coil unit mounted on a vehicle preferably has a structure having a hollow projection in cross section in the middle which is a space for installing a capacitor so as to reduce the entire thickness. Patent Document 1 discloses a wireless power supply coil unit of this type. The coil unit disclosed in Patent Document 1 is used for a mobile phone to supply power wirelessly, and includes a ferrite material (a magnetic body) used for a coil and having a projection in cross section in the middle on which wire is wound. A ferrite material, if used in a wireless power supply coil unit for a vehicle, inevitably has a larger size than that for a mobile phone, and can have less surface stiffness when having a projection in cross section.

Patent Document 2 discloses a coil unit including a plurality of flat ferrite materials brought in surface contact to partly overlap with each other so as to entirely define a projection in cross section. However, the surface contact between the ferrite materials may cause dielectric breakdown across a gap if the surfaces in contact with each other would be partly separated.

CITATION LIST

Patent Literature

Patent Document 1: Japanese Unexamined Patent Application Publication No. 2008-294385

Patent Document 2: Japanese Unexamined Patent Application Publication No. 2015-106939

SUMMARY OF INVENTION

As described above, the magnetic body (the ferrite material) having a projection used for a wireless power supply coil unit mounted on a vehicle has a problem of being damaged by external stress. In addition, the use of the plural ferrite materials brought in surface contact to provide a projection has a problem of causing dielectric breakdown between the surfaces of the ferrite materials in contact with each other.

To solve the conventional problems described above, the present invention provides a wireless power supply coil unit having high surface stiffness of ferrites and avoiding dielectric breakdown between contact surfaces of the ferrites.

A first aspect of the present invention provides a wireless power supply coil unit including a coil having a hollow portion and a coil axis in a vertical direction, a first magnetic body having an opening at a position corresponding to the hollow portion of the coil, a second magnetic body having a plate-like shape and arranged in the hollow portion of the coil, and an insulating plate interposed between the first magnetic body and the second magnetic body.

Advantageous Effects

The coil unit according to the first aspect of the present invention has high surface stiffness of ferrites and prevents or reduces dielectric breakdown between contact surfaces of the ferrites.

DESCRIPTION OF EMBODIMENTS

Hereinafter, embodiments according to the present invention will be described with reference to the drawings.

First Embodiment

Figure 1A:
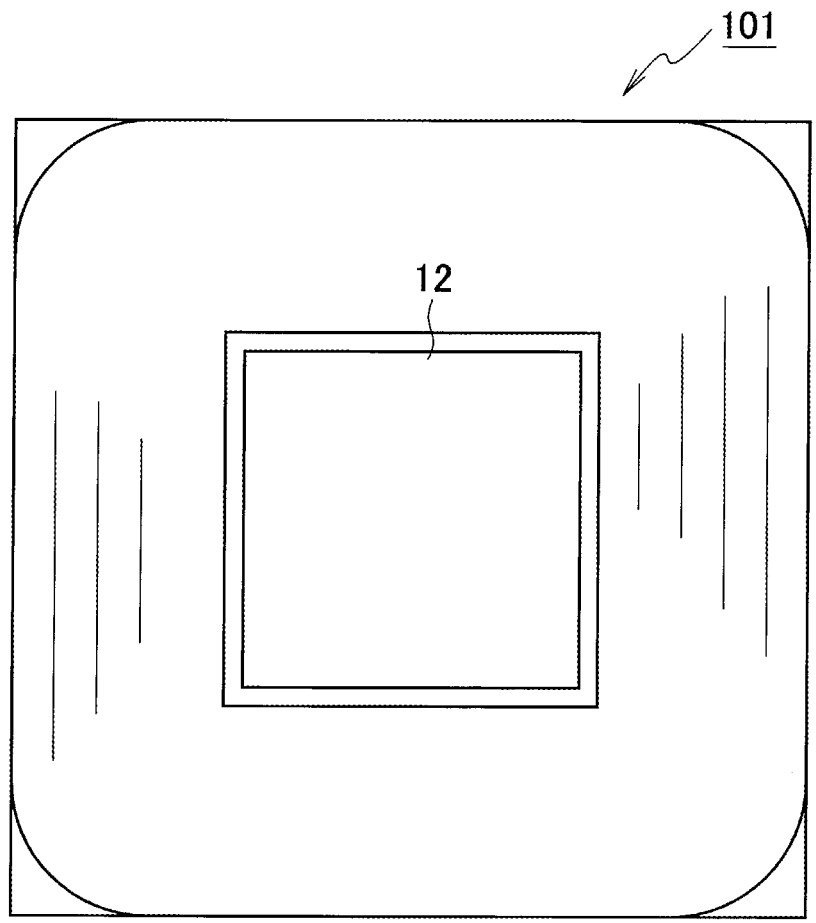
FIG. 1A is a bottom view of a coil unit according to a first embodiment of the present invention.
Figure 1B:
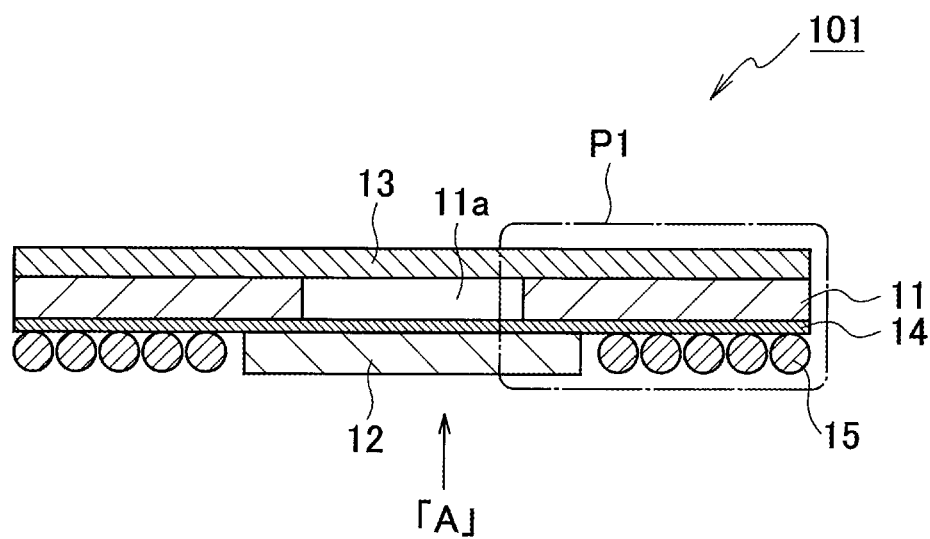
FIG. 1B is a lateral cross-sectional view of the coil unit according to the first embodiment.

FIG. 1A is a bottom view of a wireless power supply coil unit (hereinafter referred to as a "coil unit") according to a first embodiment of the present invention, and FIG. 1B is a lateral cross-sectional view of the coil unit. FIG. 1A is a view as viewed in the direction indicated by arrow A in FIG. 1B. The coil unit is a power receiving coil unit installed on the base of a vehicle to receive power transmitted from the ground side.

As shown in FIG. 1A and FIG. 1B, the coil unit 101 includes a flat base plate 13 made of aluminum and fixed to the base of the vehicle. The coil unit 101 further includes a first ferrite 11 (a first magnetic body) having a plate shape and arranged on the bottom side of the base plate 13, and a second ferrite 12 (a second magnetic body) having a plate shape and arranged on the bottom side (on one side) of the first ferrite 11.

The first ferrite 11 is provided with a rectangular opening 11a in the center, and the second ferrite 12 is located at a position corresponding to the opening 11a.

A flat insulating plate 14 including insulating material such as plastic or resin is arranged between the first ferrite 11 and the second ferrite 12. A coil 15 with wound litz wire (electrical wire) is placed at the periphery of the first ferrite 11 on the bottom side. The coil 15 has a coil axis in the vertical direction, and has a hole in the center. The position at which the second ferrite 12 is arranged corresponds to the hole of the coil 15. The coil 15 is connected to a capacitor (not shown) to implement a resonance circuit for receiving power.

The coil unit 101 is fabricated such that the base plate 13, the first ferrite 11, the insulating plate 14, and the second ferrite 12 are sequentially arranged, and the coil 15 is further placed thereon so as to be filled with resin around the entire circumference to be fixed together. The coil unit 101 is positioned to face a power transmitting coil (not shown) placed on the ground side, so that magnetic flux, which is output from the power transmitting coil upon excitation, links with the coil in the coil unit 101, thus receiving the power wirelessly.

<Positional Relationship Between First Ferrite 11 and Second Ferrite 12>

A positional relationship between the first ferrite 11 and the second ferrite 12 is described below. The second ferrite 12 has a slightly larger size than the opening 11a provided in the center of the first ferrite 11. The second ferrite 12 is arranged such that the center conforms to the center of the opening 11a of first ferrite 11, so that the periphery of the second ferrite 12 overlaps with the circumferential part around the opening 11a. The overlapping part is illustrated in FIG. 1B as indicated by reference sign P1.

Figure 2A:
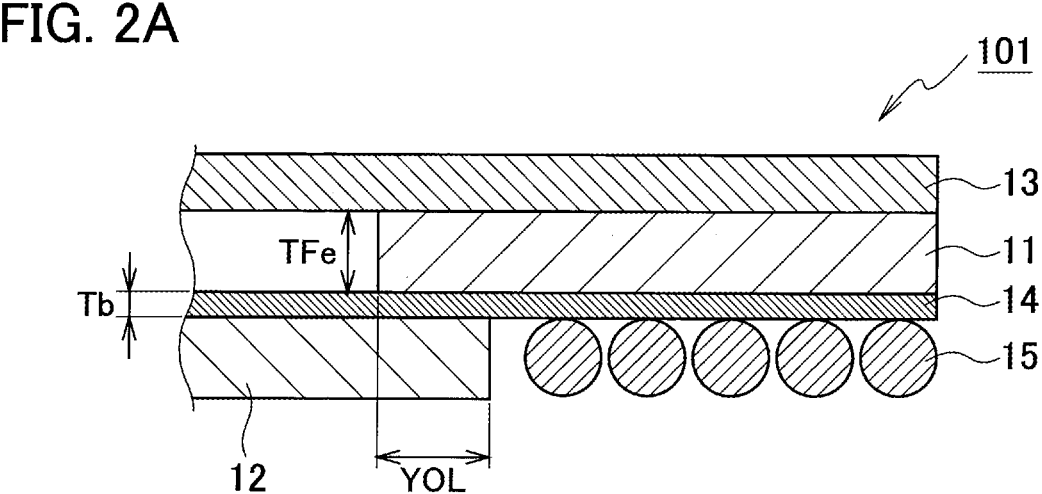
FIG. 2A is a view illustrating an overlapping part between a first ferrite and a second ferrite.
Figure 2B:
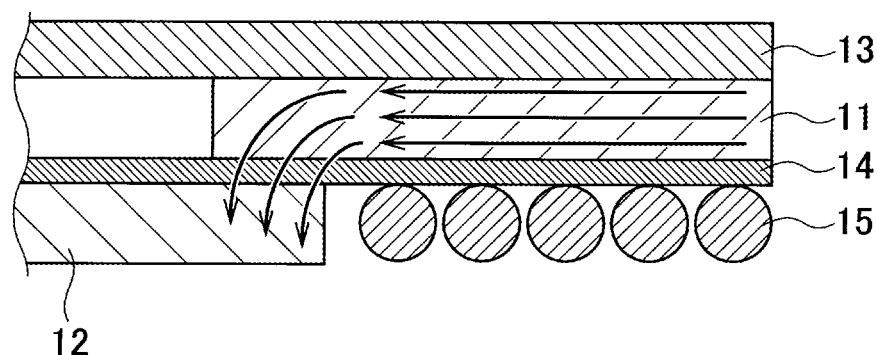
FIG. 2B is a view illustrating magnetic flux flowing through the overlapping part between the first ferrite and the second ferrite, showing a state in which an overlapping width is greater than or equal to a plate thickness of the first ferrite.

According to the present embodiment, as illustrated in FIG. 2A, an overlapping width YOL between the first ferrite 11 and the second ferrite 12 is set to be greater than or equal to a plate thickness TFe of the first ferrite 11, as given by YOL≥TFe. The overlapping part between the first ferrite 11 and the second ferrite 12 provides a magnetic flux path equivalent to the first ferrite 11 having the plate thickness TFe, so as to allow the magnetic flux to flow through, as illustrated in FIG. 2B. A magnetic flux density in the first ferrite 11 thus can be substantially equalized with that in the overlapping part. This can avoid a concentration of the magnetic flux to prevent heat generation accordingly.

Figure 2C:
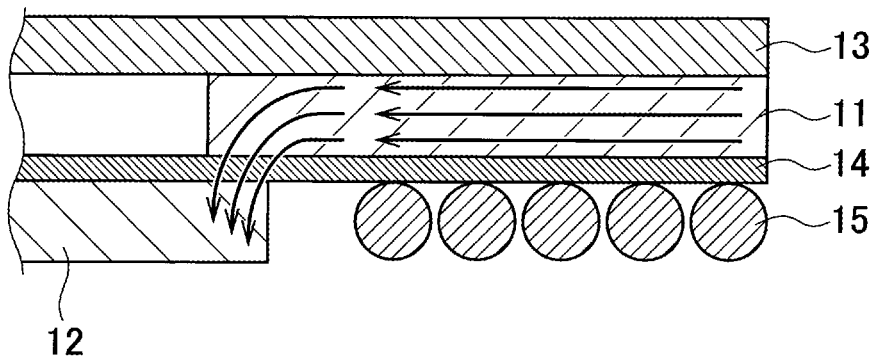
FIG. 2C is a view illustrating magnetic flux flowing through the overlapping part between the first ferrite and the second ferrite, showing a state in which the overlapping width is less than the plate thickness of the first ferrite.

If the relationship as given by YOL≥TFe is not fulfilled, the magnetic flux density in the overlapping part P1 increases, as illustrated in FIG. 2C, causing heat generation to increase a loss. The present embodiment fulfills the relationship as given by YOL≥TFe so as to avoid such a problem.

<Relationship Between Overlapping Width, Plate Thickness of Insulating Plate 14, and Plate Thickness of First Ferrite 11>

A relationship between the overlapping width YOL, a plate thickness of the insulating plate 14 as indicated by sign Tb, and the plate thickness TFe of the first ferrite 11, as shown in FIG. 2A, is described below. The insulating plate 14 may cause dielectric breakdown to lead a corona discharge to occur if a voltage applied between the first ferrite 11 and the second ferrite 12 increases. A minimum plate thickness Tb0 sufficient to prevent the corona discharge can be represented by the following formula (1):

$$Tb0 = VL\max/\alpha \qquad (1)$$

where VLmax is the applied voltage, and α is a threshold (kV/mm) of the corona discharge. The applied voltage VLmax is the maximum voltage between the first ferrite 11 and the second ferrite 12. Setting the plate thickness Tb of the insulating plate 14 to greater than or equal to the minimum plate thickness Tb0 as represented by the formula (1) when the applied voltage is VLmax, can avoid the occurrence of the corona discharge.

A minimum overlapping width YOLmin is equal to the thickness TFe of the first ferrite 11, since the relationship as given by YOL≥TFe is fulfilled, as described above. The minimum overlapping width YOLmin is thus represented by the following formula (2):

$$YOL\min = TFe \qquad (2)$$

A minimum magnetic resistance Rm_min of the overlapping part, which is a magnetic resistance when the overlapping part has the minimum overlapping width YOLmin TFe), is represented by the following formula (3):

$$Rm\_\min = 1/(\mu \cdot S) = Tb0/(\mu \cdot X \cdot TFe) \qquad (3)$$

where 1 is a distance between the first ferrite 11 and the second ferrite 12, which is the plate thickness of the insulating plate 14, μ is magnetic permeability, S is an area of the overlapping part, and X is a length of the overlapping part in depth in the horizontal direction.

For the use of the insulating plate 14 having an optional plate thickness Tb, the magnetic resistance Rm can be represented by the following formula (4):

$$Rm = Tb/(\mu \cdot X \cdot YOL) \qquad (4)$$

where YOL is the overlapping width.

To achieve the minimum magnetic resistance or less using the insulating plate 14 having an optional plate thickness Tb according to the formulae (3) and (4), the overlapping width YOL can be set to fulfill the following formula (5):

$$YOL \geq (Tb/Tb0) \cdot TFe \qquad (5)$$

The overlapping width YOL between the first ferrite 11 and the second ferrite 12 is determined in accordance with the plate thickness TFe of the first ferrite 11 and the plate thickness Tb of the insulating plate 14.

Figure 3:
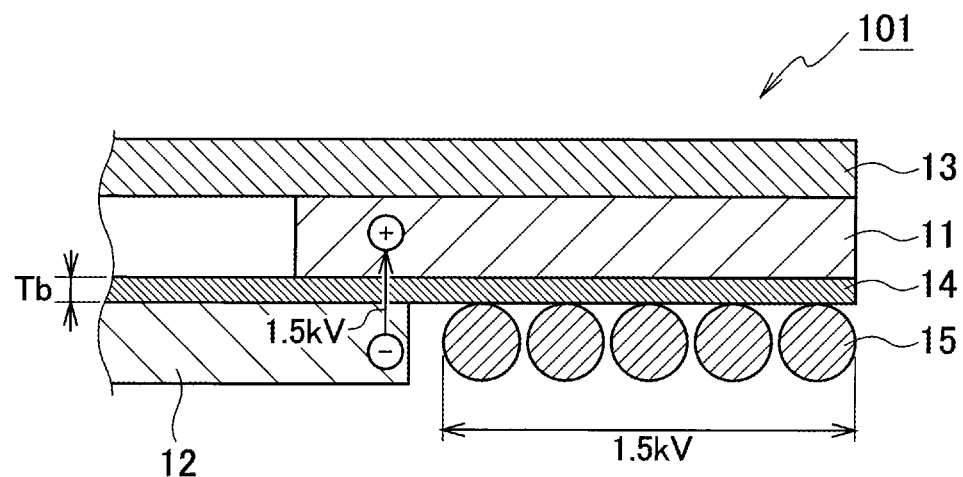
FIG. 3 is a view illustrating a voltage applied to an insulating plate.

The above maximum voltage VLmax can be a voltage applied to the coil. For example, as illustrated in FIG. 3, the voltage applied to the coil is 1.5 kV, which is set as the maximum voltage VLmax. When the threshold of the corona discharge is set to three (kV/mm), for example, the minimum plate thickness Tb0 of the insulating plate 14 results in Tb0=0.5 mm in accordance with the formula (1). The overlapping width YOL thus can be calculated by substituting, in the formula (5), 0.5 for Tb0, the actual plate thickness of the insulating plate 14 for Tb, and the actual plate thickness of the first ferrite 11 for TFe.

The operational effects of the coil unit 101 according to the present embodiment are described below. The coil unit 101 configured as described above is positioned to face a power transmitting coil unit on the ground side, so that the magnetic flux generated by the power transmitting coil unit links with the coil unit 101. The magnetic flux then flows through the overlapping part. The overlapping width YOL set to greater than or equal to the plate thickness TFe of the first ferrite 11 can avoid an increase in the magnetic flux density to prevent heat generation. The first ferrite 11 and the second ferrite 12 are arranged with the insulating plate 14 interposed therebetween so as not to be in direct contact with each other. This also prevents heat generation due to a concentration of the electric field.

Setting the plate thickness Tb of the insulating plate 14 to fulfill the formula (5) can prevent dielectric breakdown of the insulating plate 14 to avoid occurrence of a corona discharge.

The coil unit 101 according to the first embodiment includes the first ferrite 11 and the second ferrite 12, which is arranged on one side of the first ferrite 11 at the position corresponding to the opening 11a, and further includes the insulating plate 14 including insulating material such as resin and interposed between the first ferrite 11 and the second ferrite 12. Avoiding direct contact between the first ferrite 11 and the second ferrite 12 can prevent or reduce the dielectric breakdown at the contact surfaces between the first ferrite 11 and the second ferrite 12. Further, avoiding the use of the entirely-integrated ferrite structure, as described in the conventional case, increases the surface stiffness of each ferrite.

The arrangement of the second ferrite 12 partly overlapping with the first ferrite 11 allows the magnetic flux to flow through the overlapping part, so as to improve the efficiency of transmitting and receiving power.

The overlapping width YOL between the first ferrite 11 and the second ferrite 12 which is set to greater than or equal to the plate thickness TFe of the first ferrite 11, enables the density of the magnetic flux flowing through the first ferrite 11 to be substantially equivalent to that of the magnetic flux flowing through the overlapping part, avoiding the problem of causing heat generation to decrease the power supply efficiency accordingly.

The overlapping width YOL between the first ferrite 11 and the second ferrite 12 is set to increase as the plate thickness Tb of the insulating plate 14 increases, as indicated by the formula (5), so as to allow the magnetic flux to flow through more efficiently.

While the above embodiment has been illustrated with the case of the power receiving coil unit mounted on the base of a vehicle, the present invention is not intended to be limited to this case, and may be applied to a power transmitting coil unit placed on the ground side. In such a case, the arrangement direction of the coil unit illustrated in the first embodiment is vertically inverted.

Second Embodiment

Figure 4:
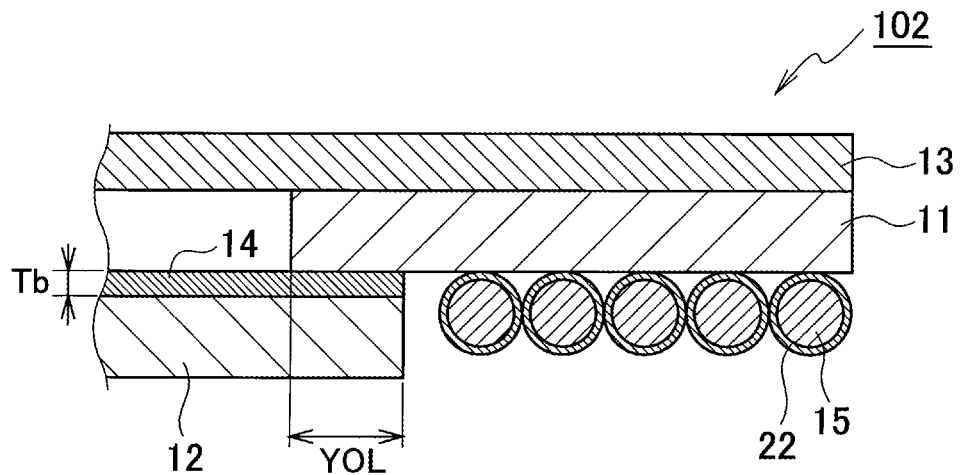
FIG. 4 is a view illustrating an overlapping part between a first ferrite and a second ferrite of a coil unit according to a second embodiment of the present invention.

A second embodiment according to the present invention is described below. FIG. 4 is a partial cross-sectional view of a coil unit 102 according to the second embodiment. The second embodiment uses litz wire, composing the coil 15 wound around the second ferrite 12, provided with a covering 22. The insulating plate 14 is not placed on the first ferrite 11 on the outside of the second ferrite 12. As illustrated in FIG. 4, the insulating plate 14 is arranged only on the upper surface of the second ferrite 12.

Such arrangement also enables the coil 15 to be insulated without the insulating plate 14 arranged in the region on which the coil 15 is wound, so as to achieve the effects similar to those of the above first embodiment. This arrangement is advantageous to the case of using the covered litz wire to compose the coil 15.

Third Embodiment

Figure 5:
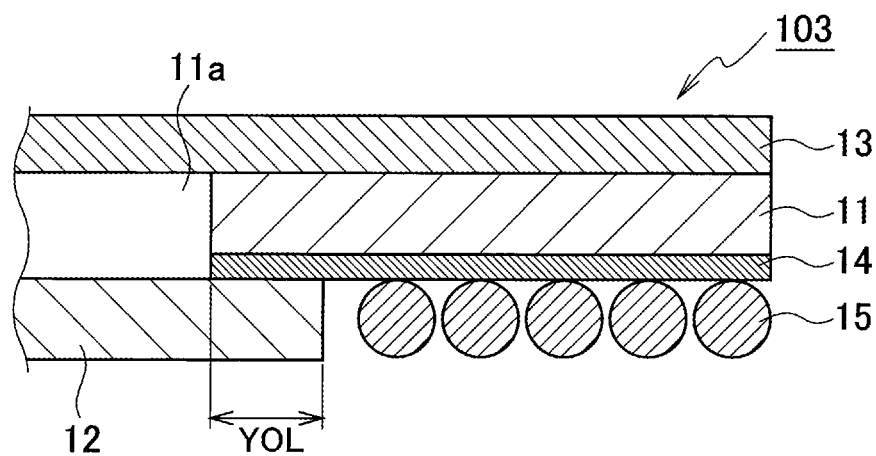
FIG. 5 is a view illustrating an overlapping part between a first ferrite and a second ferrite of a coil unit according to a third embodiment of the present invention.

A third embodiment according to the present invention is described below. FIG. 5 is a partial cross-sectional view of a coil unit 103 according to the third embodiment. The third embodiment differs from the above first embodiment in eliminating the arrangement of the insulating plate 14 at a position corresponding to the hollow of the first ferrite 11. In particular, the insulating plate 14 is arranged only in the region at which the first ferrite 11 overlaps with the second ferrite 12 and in the region on the first ferrite 11 on which the coil 15 is wound, while the insulating plate 14 is not arranged at a position corresponding to the opening 11a.

This structure decreases the arrangement area of the insulating plate 14, reducing the amount of the material used accordingly.

Fourth Embodiment

Figure 6:
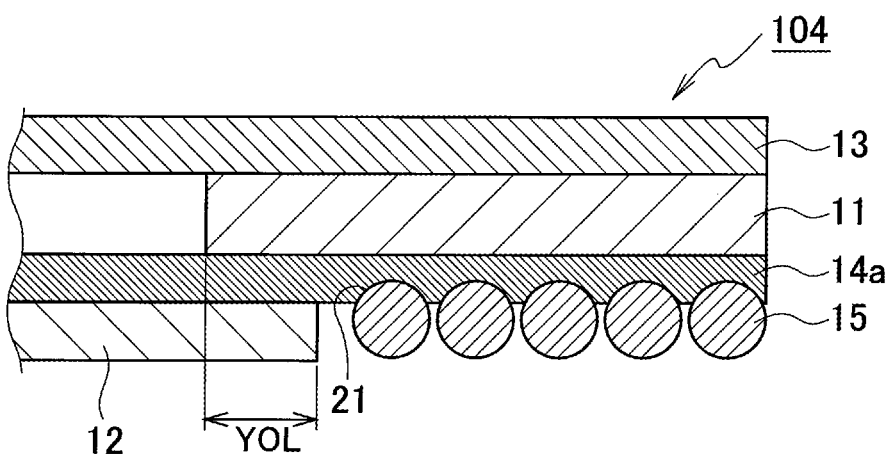
FIG. 6 is a view illustrating an overlapping part between a first ferrite and a second ferrite of a coil unit according to a fourth embodiment of the present invention.

A fourth embodiment according to the present invention is described below. FIG. 6 is a partial cross-sectional view of a coil unit 104 according to the fourth embodiment. The coil unit 104 according to the fourth embodiment includes an insulating plate 14a provided with grooves 21 having an arc shape in cross section in a region on which the coil 15 is wound. The grooves 21 for winding the coil 15 are formed on the insulating plate 14a arranged on the surface of the magnetic body (the first ferrite 11). The coil 15 is placed to fit in the grooves 21. The insulating plate 14a provided with the grooves 21 for coil winding thus serves as a bobbin for holding the coil 15.

The fourth embodiment having the above structure can also achieve the effects similar to those of the first embodiment. The insulating plate 14a also serving as a bobbin facilitates the process of winding the coil 15 on the surface of the first ferrite 11.

Alternatively, the litz wire composing the coil 15 wound around the second ferrite 12 may be provided with the covering 22, and the first ferrite 11 may be provided on the surface with grooves so as to fit the coil 15 in the grooves. This structure allows the first ferrite 11 to also serve as a bobbin, so as to facilitate the process of winding the coil 15 on the surface of the first ferrite 11.

While the wireless power supply coil unit according to the present invention has been described above by reference to the respective embodiments as illustrated in the drawings, it should be understood that the present invention is not intended to be limited to those embodiments, and the configurations of the respective elements can be replaced with optional configurations having similar functions.

REFERENCE SIGNS LIST

11 FIRST FERRITE (FIRST MAGNETIC BODY)
11a OPENING
12 SECOND FERRITE (SECOND MAGNETIC BODY)
13 BASE PLATE
14 INSULATING PLATE
15 COIL
21 GROOVE
22 COVERING
101, 102, 103, 104 COIL UNIT

The invention claimed is:

1. A wireless power supply coil unit for transmitting or receiving power wirelessly, the coil unit comprising:
   a coil having a hollow portion and a coil axis in a vertical direction;
   a first magnetic body having an opening at a position corresponding to the hollow portion of the coil;
   a second magnetic body having a plate-like shape and arranged in the hollow portion of the coil on one side of the first magnetic body; and
   an insulating plate interposed between the first magnetic body and the second magnetic body,
   wherein a periphery of the second magnetic body overlaps with a circumferential part around the opening of the first magnetic body.

2. The wireless power supply coil unit according to claim 1, wherein an overlapping width between the first magnetic body and the second magnetic body is greater than or equal to a plate thickness of the first magnetic body.

3. The wireless power supply coil unit according to claim 1, wherein an overlapping width between the first magnetic body and the second magnetic body increases as a plate thickness of the insulating plate increases.

4. The wireless power supply coil unit according to claim 1, wherein a surface of the first magnetic body or the insulating plate arranged on the surface of the first magnetic body is provided with a groove for coil winding.

5. The wireless power supply coil unit according to claim 1, wherein an overlapping width YOL between the first magnetic body and the second magnetic body is set to fulfill the following formula:

$$YOL \geq (Tb/Tb0) \cdot TFe$$

where Tb is a plate thickness of the insulating plate, Tb0 is a minimum plate thickness sufficient to avoid occurrence of a corona discharge in the insulating plate, and TFe is a plate thickness of the first magnetic body.

6. The wireless power supply coil unit according to claim 1, wherein:
a minimum plate thickness Tb0 of the insulating plate is calculated according to the following formula:

$$Tb0 = VL\max/\alpha$$

where VLmax is a maximum voltage applied between the first magnetic body and the second magnetic body, and $\alpha$ is a threshold (kV/mm) of a corona discharge; and
a plate thickness of the insulating plate is set to greater than or equal to the minimum plate thickness Tb0.

* * * * *